United States Patent
Trishuleshwar et al.

(10) Patent No.: US 8,134,726 B2
(45) Date of Patent: Mar. 13, 2012

(54) BI-DIRECTIONAL COMMUNICATION BETWEEN PRINTER AND CLIENT

(75) Inventors: Jyothiprakash Trishuleshwar, Karnataka (IN); Sriharsha Apprameya, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1239 days.

(21) Appl. No.: 11/842,365

(22) Filed: Aug. 21, 2007

(65) Prior Publication Data
US 2009/0002745 A1   Jan. 1, 2009

(30) Foreign Application Priority Data
Jun. 28, 2007  (IN) .............................. 1390/CHE/2007

(51) Int. Cl.
*G06F 3/12*        (2006.01)
(52) U.S. Cl. ......................................... 358/1.15; 710/62
(58) Field of Classification Search ................. 358/1.15; 710/62
See application file for complete search history.

(56) References Cited

U.S. PATENT DOCUMENTS

| | | | |
|---|---|---|---|
| 7,690,033 B2 * | 3/2010 | Pernia | 726/16 |
| 2003/0072031 A1 * | 4/2003 | Kuwata et al. | 358/1.15 |
| 2005/0005042 A1 * | 1/2005 | Fukunaga et al. | 710/62 |
| 2005/0157321 A1 * | 7/2005 | Alacar | 358/1.13 |
| 2005/0200873 A1 * | 9/2005 | Yamakawa et al. | 358/1.13 |
| 2005/0275876 A1 * | 12/2005 | McLean et al. | 358/1.15 |
| 2006/0050289 A1 * | 3/2006 | Abe et al. | 358/1.9 |
| 2006/0224876 A1 * | 10/2006 | Kato | 713/1 |
| 2007/0143504 A1 * | 6/2007 | Yoshida | 710/8 |
| 2007/0245345 A1 * | 10/2007 | Yamada | 717/174 |

* cited by examiner

*Primary Examiner* — James A Thompson
*Assistant Examiner* — Benjamin O Dulaney

(57) ABSTRACT

A method of enabling bi-directional communication in a point and print (PnP) architecture between a printer and a client includes initiating a PnP installation to receive a printer component at the client from a printer server. The printer component is received at the client from the printer server and a spooler process is enabled on the client to load the printer components on the client. A new thread, which executes in the context of the spooler process such that the new thread inherits the system access token from the spooler process, is used to copy the printer component to the system folder on the client. From the new thread, the printer component is registered and executed from the system folder in an elevated system context.

18 Claims, 4 Drawing Sheets

BI-DIRECTIONAL COMMUNICATION BETWEEN PRINTER AND CLIENT

CROSS REFERENCE TO RELATED APPLICATION

Applicants hereby claim foreign priority benefits under U.S.C. §119 from Indian Patent Application No. 1390/CHE/2007 filed on Jun. 28, 2007, the contents of which are incorporated by reference.

BACKGROUND

The use of group printers is becoming increasingly common. A group printer is shared by a plurality of clients, such as a plurality of individual users each accessing the group printer from an independent computer workstation. In this manner, the plurality of clients may all print to the group printer to eliminate the need for multiple printers dedicated to each user.

The vast majority of group printers utilize a point and print or "Point-n-Print (PnP)" scenario. PnP is a term that refers to the capability of allowing a client to create a connection to a group printer without providing disks or other physical installation media to the client. All necessary printer components, such as printer drivers and connectivity components, are automatically downloaded from a print server to the client. The PnP capability provides significant benefits when a large number of clients share a group printer, because PnP is the most efficient method of installing printer drivers on client machines operating with restricted user access rights.

Restricted user access rights refers to the inability of users to access certain features on a client machine. For example, a user with restricted user access rights is typically prevented from directly writing data to a system folder of a computer operating system. A system folder is an area of a hard drive, which stores essential files required for the operating system to function, such as fonts, system extensions, control panels, and preferences. Thus, for instance, a user with restricted user access rights, or a non-administrator, cannot write data to, or otherwise modify data in, the "system32" folder of the Windows™ operating system.

Many users are provided with restricted user access rights because adding, removing, and/or otherwise modifying data stored in system folders can result in severe system errors. Therefore, system administrators ("admins") prefer to prevent most users from accessing system folders. Accordingly, printer components downloaded by clients in PnP architectures are generally stored in non-system folders of the client, because most users do not have the user access rights necessary to store data in a system folder. Non-system folders are, therefore, folders, which do not require admin rights to store data therein.

Currently, the restricted user access rights held by most users only allows for one-way communication between the client and the group printer. That is, a client may send a print job from the client to the printer to be printed, but clients cannot receive communications from the group printer. This is because, bi-directional (Bi-Di) communication, which allows clients to query a printer and receive a response back from the printer, requires printer components to be stored in system folders of the client. Thus, Bi-Di communication is not feasible in current PnP architectures, because a user with restricted user access rights cannot store printer components in system folders.

However, with the complexity of print jobs and the number of clients sharing group printers increasing, the need for enabling Bi-Di communication between the printer and the clients with restricted user access rights is important for improving the functionality of group printers. This is because Bi-Di communication allows user to quickly get detailed information pertaining to the current status or failure of print jobs.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the embodiments of the invention. It will be apparent however, to one of ordinary skill in the art, that the embodiments of the invention may be practiced without limitation to these specific details. In other instances, well known methods and structures have not been described in detail so as not to unnecessarily obscure the descriptions of the embodiments.

Disclosed herein are systems and methods for enabling bi-directional (Bi-Di) communication between a printer and a client operating under a user's restricted user access rights in a point and print (PnP) architecture. As set forth above, a PnP architecture is a system, which allows a client to automatically receive printer components from a print server. Printer components are software and/or firmware, which facilitate communication between the client and a printer. For example, printer components may include printer drivers, connectivity components, and a BIDI system service. Printer drivers convert the data to be printed to the form specific to the printer to allow applications to print without being aware of the technical details of the printer model. Connectivity components and BIDI system service enable Bi-Di communication, such as requests and responses, between different devices, such as printers and clients.

The restricted user access rights assigned to a user typically prevent the user from accessing or writing data to a system folders. Therefore, in conventional PnP architectures the client is unable to store printer components to a system folder and register the printer components, thereby preventing Bi-Di communication between the printer and the client. As set forth above, these system folders can only be accessed by a system admin or a user with unrestricted user access rights. To enable Bi-Di communication, the system and methods described herein allow printer components to be stored to a system folder of the client and registered from the system folder. The printer components may be stored automatically to the system folder and without providing any enhanced access rights to the user of the client.

Figure 1A:
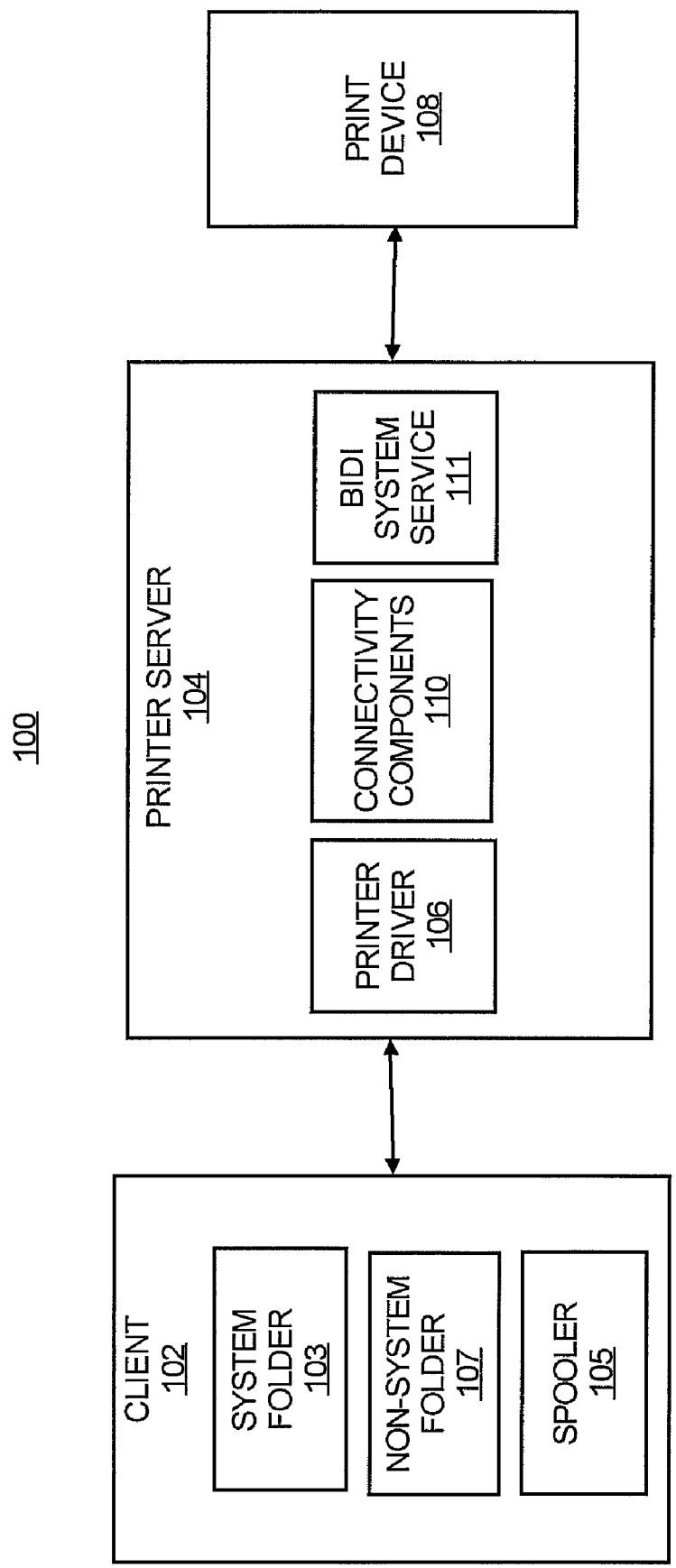
FIG. 1A shows a simplified view of PnP architecture, which enables Bi-Di communication, according to an embodiment.

With respect to FIG. 1A, there is shown a simplified block diagram of a PnP architecture 100, including a client 102 communicating with a print server 104 and a print device 108. The client 102 may be any computing device capable of running an application and transferring electronic data to the print device 108, such as a personal computer, notebook computer, etc. The client 102 may operate under the restricted user access rights of a user, such that the client 102 is prevented from accessing and writing data to a system folder 103. Therefore, in conventional PnP architectures, the client 102 may only modify the data in a non-system folder 107. As mentioned above, the non-system folder 107 is an unrestricted area of the hard drive where all users can modify the data therein.

The print server 104 contains a memory (not shown) for storing printer components. The printer components shown in FIG. 1A include a printer driver 106, connectivity components 110, and a BIDI system service 111. The client 102 may access the print server 104 to receive one or more of the printer components from the print server 104. Although three printer components are shown in FIG. 1, a person having ordinary skill in the art will appreciate that the printer components may include any reasonably suitable number of printer components. For example, the connectivity components 110 may include two or more different individual components. Similarly, the print server 104 may include one or more of the printer components depicted in FIG. 1A.

The print device 108 may be any device capable of receiving electronic data and reproducing the electronic data on physical recording media. The print device 108 may include, for example, any type of printer, such as laser printers, dot matrix printers, thermal printers, plotters, etc. The print device 108 may also include facsimile machines and other similar devices. Although, the client 102 is depicted in FIG. 1A as connected to the print device 108 through the printer server 104, a person having ordinary skill in the art will appreciate that the client 102 may access the print device 108 directly. As such, the client 102, the printer server 104, and the print device 108 may be connected through any reasonably suitable network, such as wired, wireless, the Internet, a local area network (LAN), a wide area network (WAN), etc.

It should be understood that FIG. 1A is intended as an illustrative example and that the PnP architecture 100 may have many different configurations. For instance, the PnP architecture 100 may include two or more clients 102, print servers 104, and/or print devices 108. In one example, the print device 108 may be a group printer accessed by a plurality of clients 102. Although the print device 108 and the print server 104 are illustrated as being two separate devices, in other examples the print server 104 and the print device 108 may be a single integrated device.

Figure 1B:
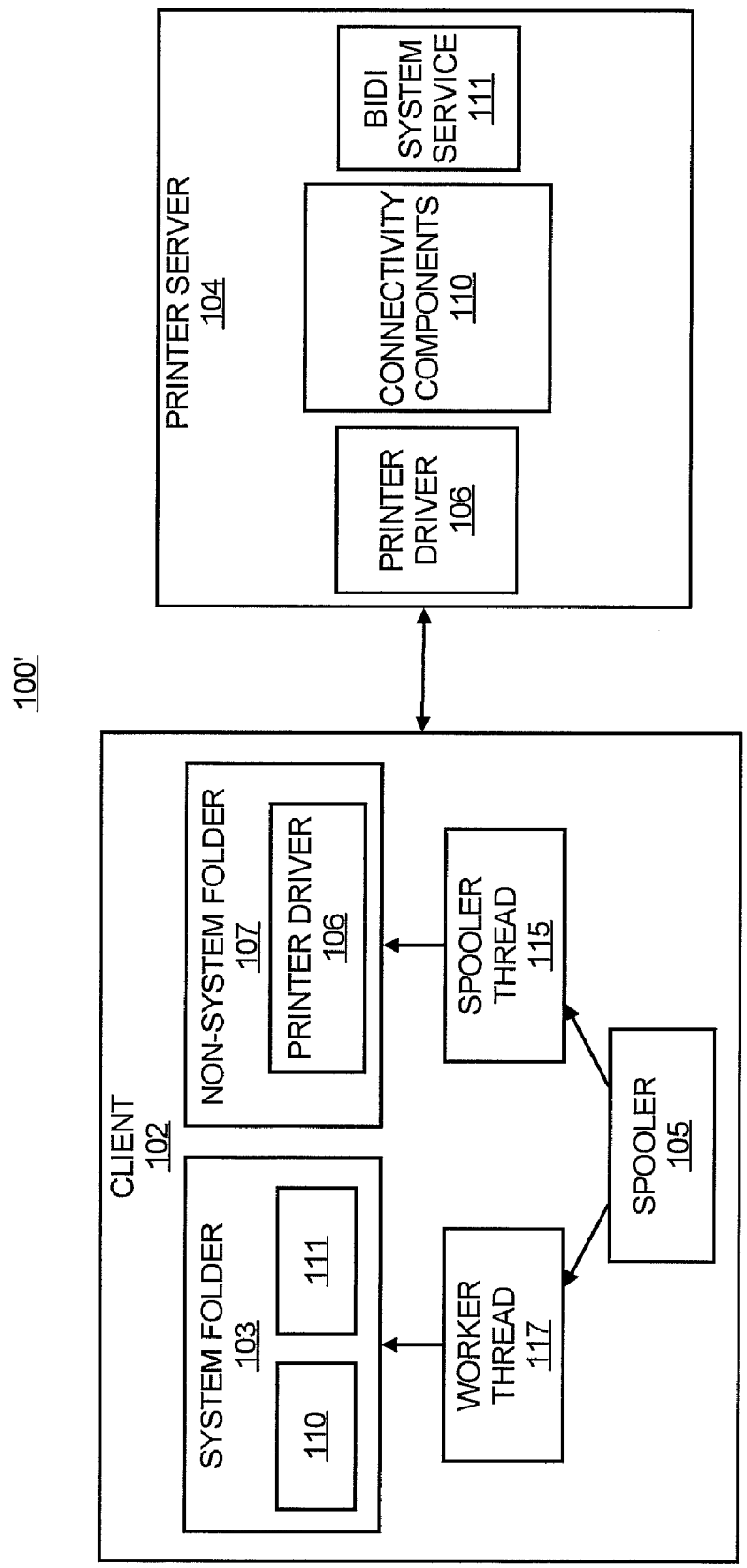
FIG. 1B shows a simplified view of the PnP architecture during a download process to enable the Bi-Di communication, according to an embodiment.

In operation, the client 102 must receive and store the printer components locally to facilitate printing to the print device 108. Therefore, the client 102 may receive the printer components from the print server 104. As such, FIG. 1B shows the PnP architecture 100 in the process of receiving the printer components from the printer server 104, according to an embodiment. The printer components may be received by a spooler 105 of the client 102, which coordinates activity and communication between the client 102 and the print server 104. The spooler 105 may initiate the standard process by spawning a spooler thread 115 to copy the received printer driver 106 to the non-system folder 107, as occurs in conventional PnP architectures. However, the spooler 105 may also generate a second thread, referred to herein as a worker thread 117, to copy printer components, such as the connectivity components 110 and the BIDI system service 111, in the system folder 103, as will be described in greater detail below.

The printer components stored in the system folder 103 may then be registered and executed from the system folder 103 from the context of a newly spawned worker thread, thereby enabling Bi-Di communication between the client 102 and the print device 109. Bi-Di communication between the client 102 and the print device 108 allows the client 102 to query the print device 108 for status and configuration information. For example, the client 102 may request data related to the status of a particular print job sent to the print device 108. The print device 108 may respond to the query from the client 102 and inform the client 102 of its status and/or configuration.

Figure 2:
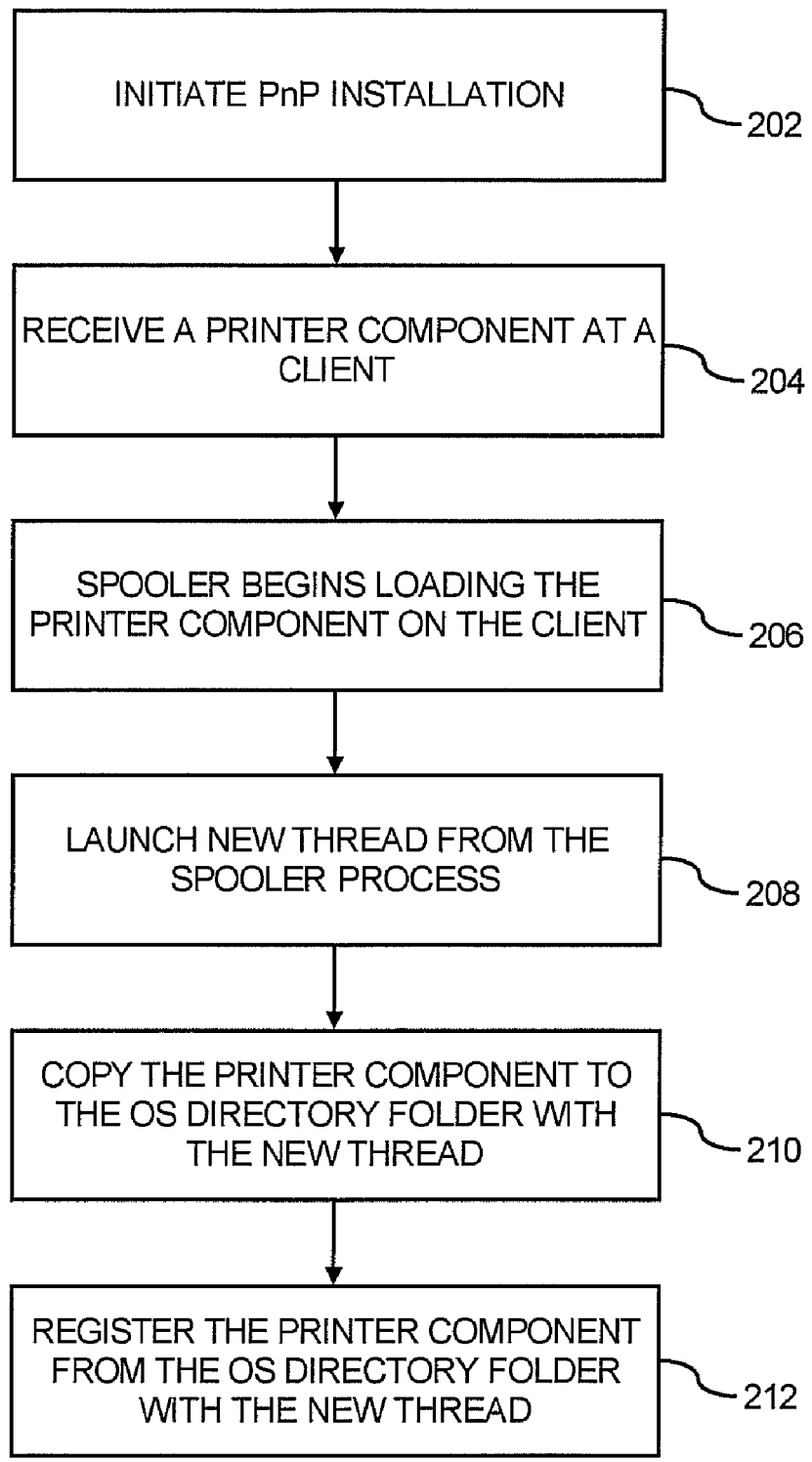
FIG. 2 shows a flow diagram of a method for enabling Bi-Di communication in a PnP architecture, according to an embodiment.

Turning now to FIG. 2, there is shown a flow diagram of a method 200 for enabling Bi-Di communication between a client having restricted user access rights and a printer device in a PnP architecture, according to an example. It is to be understood that the following description of the method 200 is but one manner of a variety of different manners in which an example of the invention may be practiced. It should also be apparent to those of ordinary skill in the art that the method 200 represents a generalized illustration and that other steps may be added or existing steps may be removed, modified or rearranged without departing from a scope of the method 200.

The description of the method 200 is made with reference to the elements depicted in FIGS. 1A-B and thus makes reference to the elements cited therein. It should, however, be understood that the method 200 is not limited to the elements set forth in FIGS. 1A-B. Instead, it should be understood that the method 200 may be practiced by a system having a different configuration than that set forth in FIGS. 1A-B.

At step 202, a PnP installation is initiated to receive a printer component at the client 102 from the printer server 104. The PnP installation refers to the process by which components needed to communicate with the print device 108 are received by the client 102. The PnP installation may occur automatically when the client 102 attempts to print. Therefore, the process may be substantially transparent to a user of the client 102. Alternatively, or in addition thereto, the PnP installation may be initiated by another client (not shown), a network admin (not shown), etc.

At step 204, a printer component is received at the client 102 from the printer server 104. As shown in FIG. 1B, the printer component may be one or more of a printer driver 106, connectivity components 110, and a BIDI system service 111, which may be transmitted from the printer server 104 to the client 102 by any method of transferring data known in the art. For example, the client 102 and the printer server 104 may be connected via a wired network or a wireless network, as set forth above. The received printer component may be a copy of one or more of the printer components stored on the printer server 104, such that the printer component is maintained on the printer server 104 for distribution to other clients (not shown).

The printer components may be received from a PnP Dynamic-link library (DLL) (not shown) of the print server 104. A DLL is a shared library which contains code, data, and/or resources in a common format. Although not illustrated in FIG. 2, the method 200 may involve creating entries in the printer registry area for the server print queue as set forth below in the following table:

| Location | Type | Name | Value |
| --- | --- | --- | --- |
| HKEY_LOCAL_MACHINE\System\CurrentControlSet\Control\Print\printers\<Printername>\CopyFiles | Registry key | BIDI | NA |
| HKEY_LOCAL_MACHINE\System\CurrentControlSet\Control\Print\printers\<Printername>\CopyFiles\BIDI\ | Registry string value | Directory | BIDI |
| HKEY_LOCAL_MACHINE\System\CurrentControlSet\Control\Print\printers\<Printername>\CopyFiles\BIDI\ | Registry (multi) string value | FILES | HPBOID.DLL |
| HKEY_LOCAL_MACHINE\System\CurrentControlSet\Control\Print\printers\<Printername>\CopyFiles\BIDI\ | Registry string value | Module | spool\DRIVERS\W32X86\3\hpzpnp.dll |

The Server Print Queue refers to the printer name in the "Printer and Faxes" folder in control panel (not shown) of the print server 104. Multiple print queues may be created and associated with a single printer component, such as the printer driver 106. The entries in the table may be created in the context of a spooler process on the print server 104. For example, the "Module" registry entry may be the name of the PnP DLL. Entries in the table above specify which printer components are received by the client 102 from the printer server 104 and also specifies where the printer components are to be stored on the client 102.

At step 206, the spooler 105 on the client 102 begins loading the printer components on the client 102. The spooler 105 is responsible for parsing the data received from the print server 104 and copying the received data referenced in the "FILES" registry value of the above-mentioned table to the registry value of the folder specified as "DIRECTORY" on the client 109. While copying the files, the spooler 105 loads the PnP DLL (The "Module" registry value), represented in this example as "HPZPNP.dll," and invokes the standard exports from this module.

The spooler 105 is a system service and always runs with elevated privileges, such as admin rights, in the system context. That is, the spooler 105 runs with an operating system access token, which gives the processes run by the spooler 105 full administrative access rights. However, the spooler 105 loads the PnP DLL from the spooler thread 115, as shown in FIG. 1B, running in the context of the current user, which has restricted user access rights. As such, the PnP DLL executes with a limited/restricted access token.

Therefore, at step 208, the worker thread 117 is launched, as shown in FIG. 1B, which executes in the context of the spooler 105 such that the worker thread 117 inherits the system access token from the spooler 105. This is because the operating system may allow a newly spawned thread/process, such as the worker thread 117, to inherit the access token of the parent process and not that of the parent thread. So, when the worker thread 117 is launched from the PnP DLL functions, which executes in the context of the spooler 105, the worker thread 117 automatically inherits the access token from the parent spooler 105. Since the spooler 105 is a system service, this access token provides full admin rights to the worker thread 117.

At step 210, the newly spawned worker thread 117 having the full unrestricted access rights copies the printer component to the system folder 103 on the client 102, such as shown in FIG. 1B. For example, the connectivity components 110 and the BIDI system service 111 may be copied to the system folder 103.

At step 212, the worker thread 117 registers the printer components from the system folder in an elevated system context. Because the thread operates with elevated privileges with the system token, as described above, the new thread is capable of registering and executing the printer components in the elevated system context. Registering printer components involves invoking a standard self-registration entry point implemented by the printer components. Some printer components, such as the BIDI system service 111 needs to be registered so as to enable a service control manager (not shown) to start/stop/control the BIDI system service 111. The printer component may be executed by the client 102 to engage in Bi-Di communication with the printer device 108.

Thus, the method 200 enables Bi-Di communication between the printer device 108 and the client 102 operating under restricted user access rights of a user. The printer components 206 necessary to enable Bi-Di communication may be copied to, registered, and executed from the system folder 103 without providing the client 102 with elevated user access rights, such as admin rights. The methods and systems described herein may be automatic and transparent to a user of the client 102, thereby increasing the efficiency and ease-of-use of the systems and methods.

Bi-Di communication allows the client 102 to query the print device 108 for device status and configuration information. The systems and methods described herein may also be extended to update a client registry at PnP install time for clients 102 with restricted user access rights. In addition, SSNP & other similar status features and applications may be enabled to work on PnP clients having restricted user access rights. SSNP refers to "Supply Status Notification Pop-ups," which allow the client 102 to be alerted through system tray pop-up messages whenever a printer event occurs, such as a paper Jam, a tray out of paper, low toner levels etc.

Moreover, enterprise auto configuration (EAC) may also be enabled by the methods and systems described herein. EAC refers to a method used by specific classes of printer drivers to query/obtain device configuration/status from the printers. For instance, the client 102 may query specific printer states such as supplies status (ink/toner levels), online/offline status, status of current print job, alerts such as paper jam, out of paper state and printer configuration, such as availability of accessories like duplexer, stapler, extra paper bins etc.

Some or all of the operations set forth in the method 200 may be contained as a utility, program, or subprogram, in any desired computer accessible medium. In addition, the method 200 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks.

Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 3:
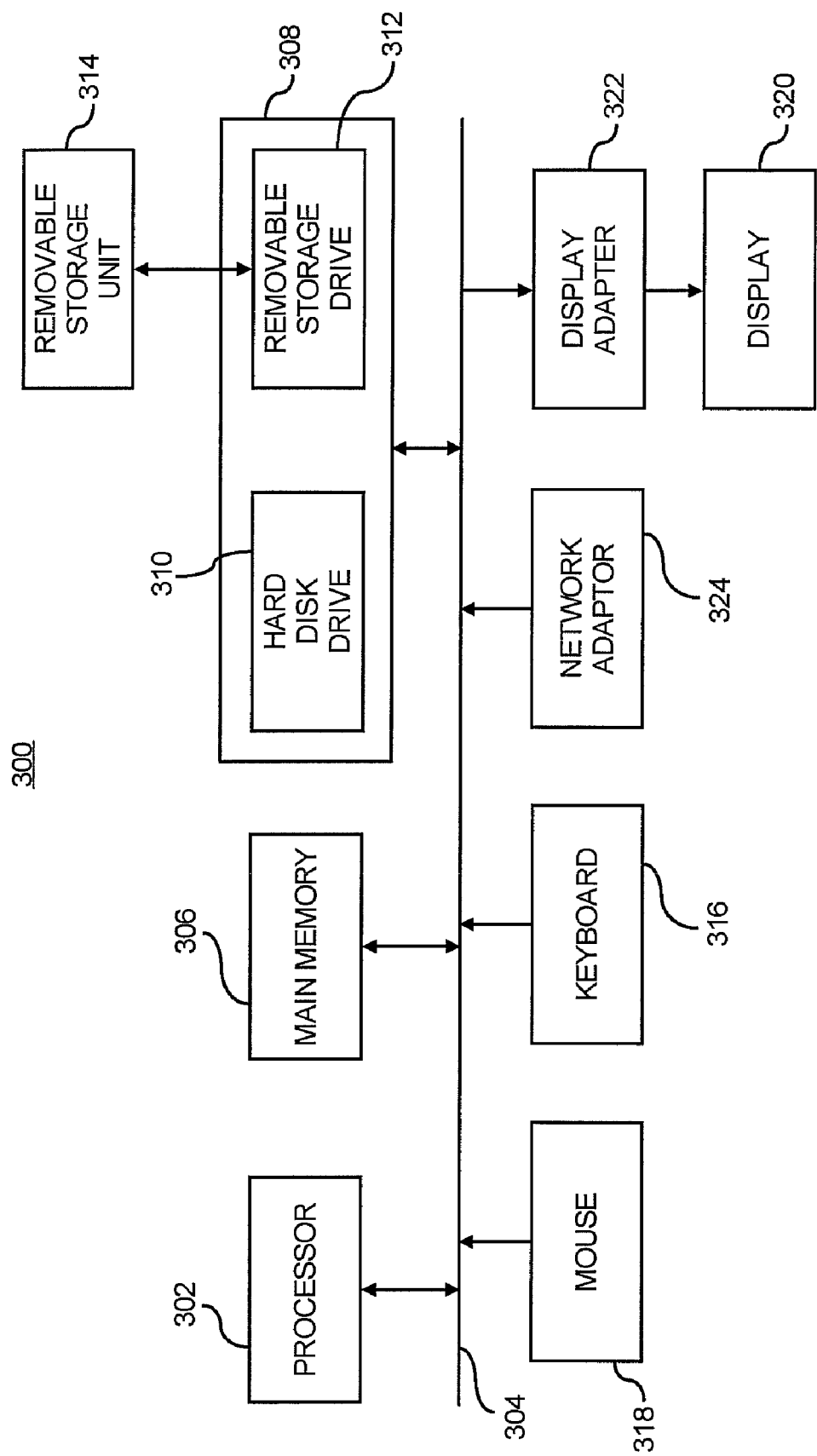
FIG. 3 illustrates a computer system, which may be employed to perform various functions described herein, according to an embodiment.

FIG. 3 illustrates a computer system 300, which may be employed to perform the various functions of the client 102, the print server 104, and/or the print device 108 described herein above, according to an example. In this respect, the computer system 300 may be used as a platform for executing one or more of the functions described hereinabove with respect to the client 102, the print server 104, and/or the print device 108.

The computer system 300 includes a processor 302 that may be used to execute some or all of the steps described in the method 200. Commands and data from the processor 302 are communicated over a communication bus 304. The computer system 300 also includes a main memory 306, such as a random access memory (RAM), where the program code for, for instance, the client 102, may be executed during runtime, and a secondary memory 308. The secondary memory 308 includes, for example, one or more hard disk drives 310 and/or a removable storage drive 312, representing a floppy diskette drive, a magnetic tape drive, a compact disk drive, etc., where a copy of the program code for installing the printer components in the OS directory folder may be stored.

The removable storage drive 310 may read from and/or write to a removable storage unit 314 in a well-known manner. User input and output devices may include, for instance, a keyboard 316, a mouse 318, and a display 320. A display adaptor 322 may interface with the communication bus 304 and the display 320 and may receive display data from the processor 302 and convert the display data into display commands for the display 320. In addition, the processor 302 may communicate over a network, for instance, the Internet, LAN, etc., through a network adaptor 324.

It will be apparent to one of ordinary skill in the art that other known electronic components may be added or substituted in the computer system 300. In addition, the computer system 300 may include a system board or blade used in a rack in a data center, a conventional "white box" server or computing device, etc. Also, one or more of the components in FIG. 3 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of enabling bi-directional communication in a point and print (PnP) architecture between a printer and a client, wherein a user of the client has restricted user access rights preventing the user from directly writing data to a system folder on the client, said method comprising:

initiating a PnP installation to receive a printer driver and a bi-directional system service at a spooler of the client from a printer server, wherein the spooler coordinates printing communication from the client to the printer;

enabling the spooler to run a first thread to load the printer driver from the spooler to a non-system folder on the client, wherein the first thread runs with a system access token;

launching a second thread, which executes in a context of the first thread of the spooler such that the second thread inherits the system access token from the first thread;

copying the bi-directional system service from the spooler to the system folder on the client with the second thread;

registering the bi-directional system service from the system folder in an elevated system context with the second thread; and using the bi-directional system service to engage in bi-directional communication for the user between the client and the printer.

2. The method of claim 1, wherein receiving the printer component at the client further comprises:

receiving a connectivity component at the spooler of the client from the print server; and copying, by the second thread, the connectivity component from the spooler to the system folder of the client.

3. The method of claim 1, further comprising:

creating entries in a printer registry area for a server printer queue on the print server.

4. The method of claim 1, wherein using the bi-directional system service to engage in bi-directional communication further comprises:

using the bi-directional system service to enable enterprise auto configuration.

5. The method of claim 1, further comprising:

querying at least one of a status and a configuration of the printer by the client.

6. The method of claim 5, further comprising:

receiving at least one of the status and the configuration of the printer at the client.

7. The method of claim 1, wherein initiating a PnP installation to receive the a printer driver and a bi-directional system service at a spooler of the client further comprises:

initiating the PnP installation by the client.

8. The method of claim 1, wherein the printer is a group printer and the method further comprises:

receiving the printer driver and bi-directional system service at a plurality of clients from the printer server.

9. A system for enabling bi-directional communication between a client and a printer in a point and print (PnP) architecture, the system comprising:

a client operating under restricted user access rights preventing a user from directly writing data to a system folder on the client, wherein the client is operable to communicate with the printer; and a printer server having a printer driver and a bi-directional system service to facilitate the bi-directional communication between the client and the printer, wherein the client is configured to receive the printer driver and a bi-directional system service at a spooler of the client from the printer server upon the initiation of a PnP installation, enable the spooler to run a first thread to load the printer driver from the spooler to a non-system folder on the client, wherein the first thread runs with a system access token, launch a second thread, which executes in the context of the first thread of the spooler such that the second thread inherits the system access token from the first thread, copy the bi-directional system service from the spooler to the system folder on the client from the second thread, register the bi-directional system service from the system folder in an elevated system context from the second thread; and use the bi-directional system service to engage in bi-directional communication with the printer.

10. The system of claim 9, wherein the client with restricted user access rights initiates the PnP installation.

11. The system of claim 9, wherein the client further receives a connectivity component at the spooler, and the spooler copies the connectivity component to the system folder.

12. The system of claim 9, wherein the client is operable to query at least one of a status and a configuration of the printer.

13. The system of claim 12, wherein the client is operable to receive at least one of the status and the configuration of the printer.

14. The system of claim 9, wherein the client is operable to create entries in a printer registry area for a server printer queue.

15. The system of claim 9, wherein the printer is a group printer configured to be accessed by a plurality of clients.

16. A non-transitory computer readable medium having code, which when executed by a processor performs a method for enabling bi-directional communication in a point and print (PnP) architecture between a printer and a client, wherein a user of the client has restricted user access rights preventing the user from directly writing data to a system folder on the client, said method comprising:

initiating a PnP installation to receive a printer driver and a bi-directional system service at a spooler of the client from a printer server, wherein the spooler coordinates printing communication from the client to the printer;

enabling the spooler to run a first thread to load the printer driver from the spooler to a non-system folder on the client, wherein the first thread runs with a system access token;

launching a second thread, which executes in a context of the first thread of the spooler such that the second thread inherits the system access token from the first thread;

copying the bi-directional system service from the spooler to the system folder on the client with the second thread;

registering the bi-directional system service from the system folder in an elevated system context with the second thread; and using the bi-directional system service to engage in bi-directional communication for the user between the client and the printer.

17. The non-transitory computer readable medium of claim 16, further comprising:

receiving a connectivity component at the spooler from the printer server; and copying, by the second thread, the connectivity component from the spooler to the system folder of the client.

18. The non-transitory computer readable medium of claim 17, wherein the client uses the connectivity component and the bi-directional system service to engage in the bi-directional communication with the printer.

* * * * *

UNITED STATES PATENT AND TRADEMARK OFFICE
CERTIFICATE OF CORRECTION

PATENT NO. : 8,134,726 B2
APPLICATION NO. : 11/842365
DATED : March 13, 2012
INVENTOR(S) : Jyothiprakash Trishuleshwar et al.

It is certified that error appears in the above-identified patent and that said Letters Patent is hereby corrected as shown below:

In column 8, line 39, in Claim 7, delete "the a" and insert -- a --, therefor.

Signed and Sealed this
Sixth Day of November, 2012

David J. Kappos
*Director of the United States Patent and Trademark Office*